United States Patent
Gulati

(10) Patent No.: US 12,077,724 B2
(45) Date of Patent: Sep. 3, 2024

(54) METHOD OF IMPROVED PRODUCTION OF RECONSTITUTED ESSENTIAL OILS

(71) Applicant: BMV Fragrances [P] Ltd., Greater Noida (IN)

(72) Inventor: Mohit Gulati, Greater Noida (IN)

(73) Assignee: BMV FRAGRANCES (P) LTD. (IN)

( * ) Notice: Subject to any disclaimer, the term of this patent is extended or adjusted under 35 U.S.C. 154(b) by 722 days.

(21) Appl. No.: 17/285,870

(22) PCT Filed: Oct. 15, 2019

(86) PCT No.: PCT/IN2019/050765
§ 371 (c)(1),
(2) Date: Apr. 15, 2021

(87) PCT Pub. No.: WO2020/079707
PCT Pub. Date: Apr. 23, 2020

(65) Prior Publication Data
US 2021/0348082 A1 Nov. 11, 2021

(30) Foreign Application Priority Data
Oct. 15, 2018 (IN) .............................. 201811039032

(51) Int. Cl.
| | |
|---|---|
| *C11B 9/02* | (2006.01) |
| *B01D 3/10* | (2006.01) |
| *B01D 5/00* | (2006.01) |
| *C11B 9/00* | (2006.01) |
| *B01D 3/38* | (2006.01) |

(52) U.S. Cl.
CPC ................ *C11B 9/022* (2013.01); *B01D 3/10* (2013.01); *B01D 5/0063* (2013.01); *B01D 3/38* (2013.01)

(58) Field of Classification Search
CPC .. C11B 9/022; C11B 9/00; B01D 3/10; B01D 3/02; B01D 3/009; B01D 3/38; B01D 5/0063
USPC ......................................................... 512/5, 1
See application file for complete search history.

(56) References Cited

U.S. PATENT DOCUMENTS

| | | |
|---|---|---|
| 4,093,565 A | 6/1978 | Steltenkamp |
| 4,377,714 A | 3/1983 | Yoshida |

FOREIGN PATENT DOCUMENTS

| | | | |
|---|---|---|---|
| CA | 2759869 C | | 2/2015 |
| CN | 107805555 A | | 3/2018 |
| CN | 108130190 A | * | 6/2018 |

OTHER PUBLICATIONS

Kim et al., CN108130190 Machine Translation, Jun. 8, 2018 (Year: 2018).*
Extended European Search Report, 6 pages, Jun. 24, 2022.
Examination Report from Indian Patent Office, 5 pages, Oct. 20, 2022.
International Search Report, 9 pages, Jan. 23, 2020.

* cited by examiner

*Primary Examiner* — Jessica Whiteley
(74) *Attorney, Agent, or Firm* — Fulwider Patton LLP

(57) ABSTRACT

The present invention relates to the field of perfumery, that is, the art or process of making a fragrant substance be it natural or synthetic.

The present invention discloses a method of obtaining a better reconstituted essential oil NNO+ comprising the steps of: a) adding the reconstituted essential oil with distilled water; b) refluxing the mixture of step (a); c) resting the mixture of step (b); d) separation of essential oil and water from the mixture of step (c); e) allowing the solution of step (d) to stand for maturation of the reconstituted essential oil NNO+.

16 Claims, 1 Drawing Sheet

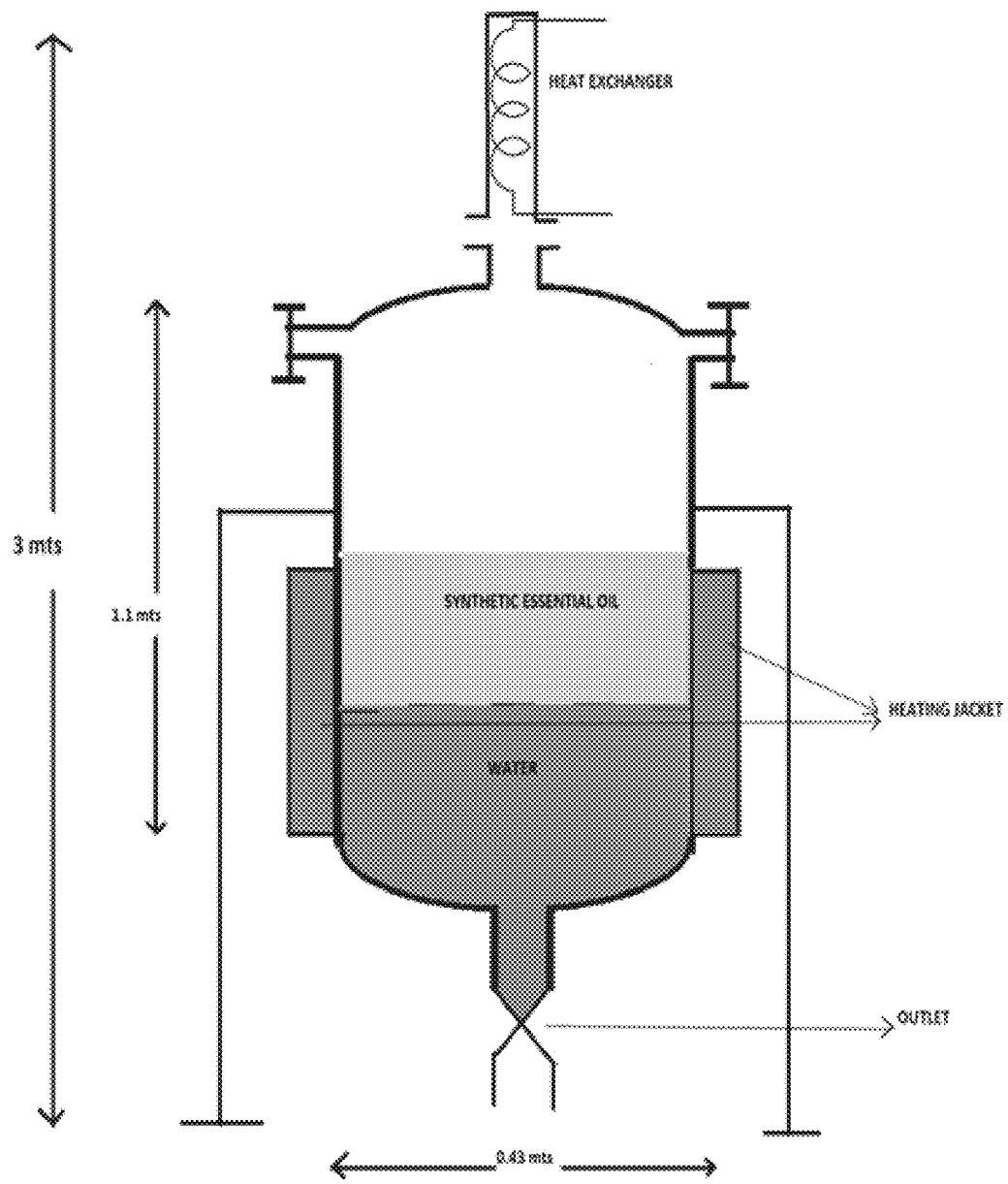
Commercial diagram for the process

METHOD OF IMPROVED PRODUCTION OF RECONSTITUTED ESSENTIAL OILS

CROSS-REFERENCE TO RELATED APPLICATIONS

This application is the U.S. National Stage of International Application No. PCT/IN2019/050765, filed Oct. 15, 2019, which claims priority to Indian Patent Application No. 201811039032, filed Oct. 15, 2018.

FIELD OF INVENTION

The present disclosure relates to the field of perfumery, that is, the art or process of making a fragrant substance be it natural or synthetic.

BACKGROUND OF INVENTION

Perfume (French: parfum) is a mixture of fragrant essential oils or aroma compounds, fixatives and solvents, used to give the human body, animals, food, objects, and living-spaces an agreeable scent. It is usually in liquid form and used to give a pleasant scent to a person's body. Ancient texts and archaeological excavations show the use of perfumes in some of the earliest human civilizations. Modern perfumery began in the late 19th century with the commercial synthesis of aroma compounds such as vanillin or coumarine, which allowed for the composition of perfumes with smells previously unattainable solely from natural aromatics alone.

In today's world of perfumery, the perfumers face a huge problem of procuring the natural essential oils from around the world. With so much civilisation and cutting off of the natural habitats around the world, there is a shortage in the availability of the natural product. This also leads to the farmers or the producers following different practices to make up for the ever-growing supply. This in turn leads to variations to the product, which is a precarious situation for the perfumers.

This led to usage of synthetic reconstitutions of natural products in perfumery and flavours as well. Reconstitution literally means building up again. A reconstitution is an attempt by the creator that it is olfactorarily and somewhat visually similar to the natural counterpart so much so that it can replace the pure product. This reconstitution is generally cheaper in price. The biggest advantage of these reconstitutions is the stability of the product, that is, the reconstitution will not have variations since it is a formula just like any other fragrance.

As per the book by Stefan Arctander, an essential oil is a volatile material derived by a physical process from the odorous plant material of a single botanical form and the species with which it agrees in name and odour.

A synthetic essential oil may be defined as a reconstitution of a natural essential oil. These reconstituted essential oils are made up of synthetic aromatic chemicals, natural aromatic products or other reconstituted oils and absolutes to obtain a product that is organoleptically similar to the natural product.

OBJECT OF INVENTION

It is an object of embodiments described herein to address the limitations and problems faced to counter the demand of natural essential oils and also substituting it with reconstituted essential oils.

It is another object of the invention is obtaining a better synthetic essential oil called NNO+. A method performed by refluxing the reconstituted essential oil in water under vacuum and heat and obtaining NNO+.

BRIEF DESCRIPTION OF INVENTION

The perfumer achieves this build-up of the reconstitution by mainly two tools, namely, a GCMS—Gas Chromatography—Mass Spectrometry and the perfumer' organoleptic senses.

A GCMS, is an analytical method that combines the features of Gas Chromatography and mass spectrometry. This method identifies the different substances within a test sample. The perfumer analyses and studies analytical report created by the GCMS. An example of the GCMS report is Identified compounds from the agar oil extracted from fungal infected Agarwood by GCMS S. 1. Cyclopentadecanol 7.421% 2. Decanoic acid 8.839% 3. 4-(4-methoxyphenyl)-2-butanone 8.914% 4. Pentadecanoic acid 9.139% 5. 3-methyl-2-(2-methyl-2-butenyl)-furan 10.190% 6. Pentadecanoic acid-15 Bromo 10.715% 7. 2-isobutyl-3methyl furan 10.940% 8. Oleic acid 11.107% 9. 3-methyl-2-(2-oxopropyl) furan 11.307% 10. Tetradecanoic acid 11.723% 11. Hexadecanoic acid, 14 methyl, methyl ester 13.675% 12. Heptatriactontadien-2-one 13.501% 13. 4-hydroxy-3,5-dimethoxybenzyldehyde 13.767% 14. 4 phenyl-2-butatone 11.857% 15. (S)-4a-methyl-2-(1-methylethyl)-3,4,9,5,6,7-hexahydro-naphthalene 12.808% 16. 4-hydroxy-3,5-dimethoxybenzyldehyde 15.360% 17. Bis (2-ethylhexyl) phythalate 15.410% This report helps the perfumer to build the base of his reconstitutions by identifying the main components of the natural absolute and substituting them with similarly smelling compounds. For examples one of the products is built up as shown in table 1.

Secondly, the organoleptic properties, the perfumer applies his/her knowledge, experience and the organoleptic senses to cement the edges of the base created. He does this by adding essential oils, absolutes, synthetic essential oils, absolutes to recreate the smell or flavour of the natural counterpart.

After many experiments, the final product is obtained. This product is called a reconstitution. A product which smells almost or somewhat similar to the natural product.

But there is always a difference between the two products. This difference depends on two things. The talent, skill and its application of the perfumer, i.e. the analysis of the GCMS plus the understanding of the natural product organoleptically.

Secondly, the difference between nature and manmade product. A natural product can never be 100% duplicated. The reconstitution will always be a reconstitution. A natural essential oil can never have a perfect substitute.

But as the modern perfumery is now the art of substitutes, BMV Fragrances Pvt. Ltd. experimented and tried to bridge this gap by introducing the effect of water and temperature to the reconstitutions. The natural essential oils from the raw material are obtained by following processes:

1. Water distillation
2. Steam distillation
3. Water and steam distillation
4. Dry distillation In a water distillation, the plant material is in direct contact with water. The heat is provided from the steam jacket, the is no risk of burning the plant material.

BMV Fragrances Pvt. Ltd. experimented by subjecting the synthetic essential oils with water and steam and applied this practice on synthetic or reconstituted essential oils by considering the reconstitutions as plant material and performing water reflux on them to obtain a better reconstitution. This introduced the effect of water and the temperature at which the distillation takes place on the reconstitutions to obtained the more complete reconstituted essential oil.

DETAILED DESCRIPTIONS OF INVENTION WITH REFERENCE TO DRAWINGS

FIG. 1: Shows the diagrams for the experimental set up for the reflux of the reconstituted essential oil.

EXPERIMENTAL METHOD

For this method, a synthetic essential oil aimed to be a reconstitution is required. A distillation unit to apply heat and vacuum, is also required to perform the reflux.

1st step, the synthetic compound and obtained. This is put in the refluxing flask. The same amount of distilled water is also added to this flask.

The mixture is put under vacuum and subjected to heat. The temperature is set at 100 degree Celsius, as it the temperature of steam. This is shown is the diagram . . . .

The mixture undergoes reflux for 4 hours and 100 degree Celsius and under vacuum. After 4 hours of reflux the mixture is allowed to stand overnight at room temperature for it to mature.

The next day, this mixture is put into a separating funnel where the water and reconstituted oil is separated. In case the oil obtained is not clear, the separation process is not over. Salt is added to remove all the moisture from the oil. When the clear oil is obtained, it is allowed to mature for 48 hours.

This matured essential oil is the required product ready for use and is called NNO+ The GCMS analysis report is shown in Table 2.

The evaluation shows that the NNO+ is better than the original compound organoleptically.

Evaluation Example

Armoise NNO
Organoleptic Properties:
  Colour/Appearance: Slightly green liquid
  Odour: Sharp camphoracous thujonic fresh
  Taste: Bitter taste.
Solubility: Soluble in Alcohol
  Armoise NNO+
Organoleptic Properties:
  Colour/Appearance: Slightly green, liquid
  Odour: Soft and refresh aroma, reminiscent of Armoise oil.
  Solubility: Soluble in alcohol
  Taste: Bitter taste.
Commercial Method Similarly, to the experimental method, the commercial method starts with the raw reconstituted essential oil. The quantity is more than the experiment sample. Let us say the quantity is 100 kilo grams.

A distillation unit is used to obtain the required product. Overtime we have observed that a unit of 600 kilo grams capacity is the most efficient for the reflux of 100 kilo grams of essential oil and 100 kilo grams of water along with it.

The method is as follows:

First, we mix the reconstituted absolute with distilled water at a ratio of 1:1.

Secondly, this mixture is allowed to reflux for 4 hours at a constant temperature of 100 degree Celsius under vacuum.

After this the mixture is allowed to rest at room temperature and normal atmospheric pressure overnight.

The next day, the oil and water is separated.

The separated reconstituted and refluxed oil is allowed to mature for 48 hours.

The obtained is Reconstituted essential oil ready to be shipped called NNO+

Losses
  Loss of soluble matter.
  Some of the matter in the synthetic essential oil may be soluble or partially soluble in water. This material is lost during the separation of the reconstituted essential oil. This loss is somewhat constant.
Handling Losses
  Transferring of material from one unit to another unit or tank leaves a handling loss. The percentage of handling loss is less for higher quantities.
Tables and Diagrams:

TABLE 1

Armoise NNO

| S. No. | Ingredient | Percentage |
| --- | --- | --- |
| 1 | Alpha Pinene | 7.61 |
| 2 | Camphene | 4.25 |
| 3 | Sabinene | 2.01 |
| 4 | Beta Pinene | 1.48 |
| 5 | Phellandrene | 0.26 |
| 6 | Para Cymene | 1.62 |
| 7 | Limonene | 1.98 |
| 8 | Eucalyptol | 3.79 |
| 9 | Gamma Terpinene | 1.02 |
| 10 | Alpha Thujone | 5.42 |
| 11 | Fenchyl Alcohol | 4.44 |
| 12 | Camphor | 29.87 |
| 13 | Iso Borneol | 0.19 |
| 14 | Alpha Copaene | 2.52 |
| 15 | Germacrene D | 0.3 |
| 16 | Caryophyllene | 1.01 |
| 17 | Delta Cadinene | 1.19 |
| 18 | Alpha Cedrol | 0.52 |

TABLE 2

Armoise NNO+

| S. No. | Ingredient | Percentage |
| --- | --- | --- |
| 1 | Alpha Pinene | 7.5 |
| 2 | Camphene | 4.28 |
| 3 | Sabinene | 1.97 |
| 4 | Beta Pinene | 1.51 |
| 5 | Phellandrene | 0.26 |
| 6 | Para Cymene | 1.68 |
| 7 | Limonene | 2.06 |
| 8 | Eucalyptol | 3.91 |
| 9 | Gamma Terpinene | 1.11 |
| 10 | Alpha Thujone | 5.55 |
| 11 | Fenchyl Alcohol | 4.55 |
| 12 | Camphor | 29.89 |
| 13 | Iso Borneol | 0.22 |
| 14 | Alpha Copaene | 2.58 |
| 15 | Germacrene D | — |
| 16 | Caryophyllene | 1.02 |
| 17 | Delta Cadinene | 1.19 |
| 18 | Alpha Cedrol | 0.48 |

I claim:

1. A method of obtaining a reconstituted essential oil which comprises synthetic aromatic chemicals, natural aromatic products, or other reconstituted oils or absolutes comprising the steps of:
   a) adding the reconstituted essential oil with distilled water;
   b) refluxing the mixture of step (a);
   c) resting the mixture of step (b);
   d) separation of essential oil and water from the mixture of step (c)
   e) allowing the solution of step (d) to stand for maturation of the reconstituted essential oil.

2. The method as claimed in claim 1, wherein the ratio of the reconstituted absolute with distilled water is about 1:1.

3. The method as claimed in claim 1, wherein the refluxing of mixture in step (a) is carried for at least 4 hours.

4. The method as claimed in claim 1, wherein refluxing of mixture in step (a) at a constant temperature of 100 degree Celsius under vacuum.

5. The method as claimed in claim 1, wherein resting of mixture in step (b) is at room temperature and normal atmospheric pressure overnight.

6. The method as claimed in claim 1, wherein separating of essential oil and water in step (c) carried on the next day.

7. The method as claimed in claim 1, wherein maturing of reconstituted and refluxed oil in step (d) is for 48 hours.

8. The method as claimed in claim 1, wherein the reconstituted essential oil has organoleptic properties.

9. A fragrance product comprising reconstituted essential oil which comprises synthetic aromatic chemicals, natural aromatic products, or other reconstituted oils or absolutes prepared by a process comprising the steps of:
   a) adding the reconstituted essential oil with distilled water;
   b) refluxing the mixture of step (a);
   c) resting the mixture of step (b);
   d) separation of essential oil and water from the mixture of step (c)
   e) allowing the solution of step (d) to stand for maturation of the reconstituted essential oil.

10. The product as claimed in claim 9, wherein the ratio of the reconstituted absolute with distilled water is about 1:1.

11. The product as claimed in claim 9, wherein the refluxing of mixture in step (a) is carried for at least 4 hours.

12. The product as claimed in claim 9, wherein refluxing of mixture in step (a) at a constant temperature of 100 degree Celsius under vacuum.

13. The product as claimed in claim 9, wherein resting of mixture in step (b) is at room temperature and normal atmospheric pressure overnight.

14. The product as claimed in claim 9, wherein separating of essential oil and water in step (c) carried on the next day.

15. The product as claimed in claim 9, wherein maturing of reconstituted and refluxed oil in step (d) is for 48 hours.

16. The product as claimed in claim 9, wherein the reconstituted essential oil has organoleptic properties.

\* \* \* \* \*